No. 641,506. Patented Jan. 16, 1900.
R. GOODWIN.
APPARATUS FOR PRODUCING ACETYLENE AND CARBONIC ACID GAS COMBINED.
(Application filed Jan. 23, 1897.)
(No Model.)
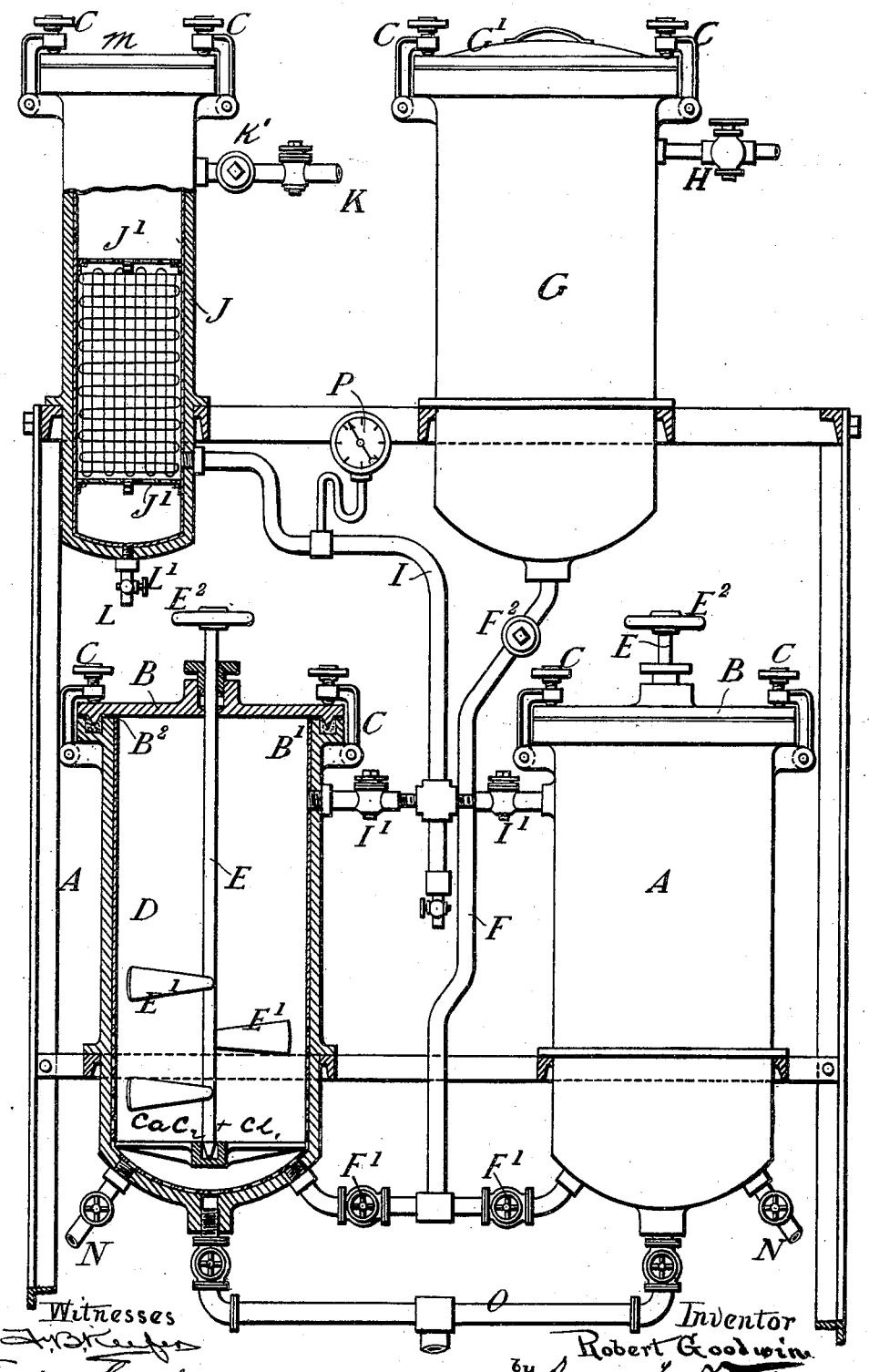

UNITED STATES PATENT OFFICE.

ROBERT GOODWIN, OF DUBLIN, IRELAND, ASSIGNOR TO MICHAEL CROWLEY, OF SAME PLACE.

APPARATUS FOR PRODUCING ACETYLENE AND CARBONIC-ACID GAS COMBINED.

SPECIFICATION forming part of Letters Patent No. 641,506, dated January 16, 1900.

Application filed January 23, 1897. Serial No. 620,464. (No model.)

*To all whom it may concern:*

Be it known that I, ROBERT GOODWIN, electrician, a citizen of England, residing at 24 Exchequer street, Dublin, Ireland, have invented a certain new and useful Apparatus for the Production and Purification of Acetylene and Carbonic-Acid Gas Combined, (for which I have obtained Letters Patent in Great Britain, dated August 10, 1896, No. 17,644; in France, dated January 14, 1897, No. 263,089; in Belgium, dated January 15, 1897, No. 125,750; in Austria, dated April 12, 1897, No. 1,296/47, and in Canada, dated July 12, 1897, No. 56,595,) of which the following is a specification.

My invention has for its object to produce acetylene gas free from impurities and mixed with carbonic-acid gas, whereby a perfect combustion of the gas is insured free from all deposit, such as occurs with acetylene gas as heretofore manufactured. For this purpose I employ combined apparatus, as I will describe, with reference to the accompanying drawing, which shows a diagrammatic vertical section of the same.

A A are cylindrical vessels lined with lead and closed at top by a cover B, which is secured in a gas-tight manner by being pressed down by pivoted screw-clamps C, the cover having, preferably, a projecting rim B', fitting in a trough with sand lute and also fitting with faced surfaces at B² with asbestos or other suitable packing. These vessels are charged with calcium carbid, to which there is added a certain proportion of limestone, chalk, marble, or other substance that will produce carbonic acid when treated with acidulated water. The carbid is for convenience of removal contained in a removable cage D, of perforated iron or of iron wire. Centrally through a stuffing-box in the cover passes a spindle E, having projecting arms E' and capable of being rotated by a crank-handle E² for stirring up the carbid and limestone, &c., so as to produce an effective action of the water thereon.

The above-described vessels A are connected at their lower ends by a branched pipe F with an upper vessel G, also of iron, lined with lead, which is supplied through a pipe H with water acidulated with a suitable acid, such as sulfuric acid, and from which the water is allowed to flow down in regulated quantities through the pipe F, which is for this purpose provided with stop-cocks F' F' and with a check-valve at F².

The mixture of acetylene and carbonic-acid gases generated in the vessels A A is led from the upper parts thereof through a branched pipe I, provided with stop-cocks I' I', to the lower part of the purifying vessel J, also made of iron, lined with lead. This vessel is divided by two perforated lead partitions J' J' into three compartments. The middle one of these is filled with wire, preferably of lead, coiled in various directions around a star-shaped frame of either lead or iron, and the pipe I enters the lower end of this compartment, so that as the combined acetylene and carbonic-acid gases enter the compartment they will in rising up through the lead-wire filling be effectually mixed together. These mixed gases then pass through the upper partition J' into the top compartment, which is filled with sulfate of copper, which effectually purifies the gases passing through from impurities, and the purified gases are led off from the upper end of the compartment through a branch pipe K, provided with a cock K' and a check-valve K², to a gas-holder. The impurities separated from the gas descend by gravity into the bottom compartment, whence they are discharged from time to time through a discharge-pipe L, provided with a cock L'. The top of the vessel J is closed by a removable gas-tight cover M, arranged similar to that described with reference to the vessels A, so as to enable the contents of the vessel to be removed and renewed when required. For clearing the vessels A of spent carbid, &c., a sluicing-pipe N is provided near the bottom, and at the bottom is a discharge-pipe O, communicating with a drain or other place of discharge. Any solid residue remaining is removed by taking out the perforated bucket D, which is then recharged with fresh material.

For producing a mixture of acetylene and carbonic-acid gases I prefer to charge the vessels A with a mixture of about three-fourths calcium carbid and one-fourth of limestone, chalk, or marble. The water in the vessel G in that case is acidulated with about one part of sulfuric or other suitable acid to seventeen parts of water. This mixture may either be effected in the vessel G itself, the cover G' of which is removable, or the mixture may be made in a separate tank and supplied thence through the pipe H.

A pressure-gage P is provided on the pipe I for indicating the pressure of the gases passing off from the vessels A. Should the pressure be found to rise above the required normal, the supply of water is restricted by more or less closing the cocks on the pipe F.

It will be evident that a greater number than two of the generating vessels A may be combined in the apparatus, so that a certain number may always be in action while the other or others are being cleared and charged afresh.

Having thus described the nature of this invention and the best means I know for carrying the same into practical effect, I claim—

In apparatus for the manufacture of a mixture of acetylene gas and carbonic acid the combination of a vessel such as A charged with a mixture of calcium carbid and limestone, chalk, or marble, a second vessel such as G from which acidulated water is supplied in regulated quantities to the vessel A for generating both acetylene and carbonic acid, and a purifying vessel such as J divided by perforated partitions into three compartments the upper one of which is charged with sulfate of copper for purifying the gases, while the middle one contains wire filling for effectually mixing the gases passing through it; the lowest compartment serving to collect the separated impurities, substantially as described.

In testimony whereof I have signed my name to this specification, in the presence of two subscribing witnesses, this 11th day of January, A. D. 1897.

ROBERT GOODWIN.

Witnesses:
HENRY WALKER,
JOHN EARLY.